US012803046B2

(12) United States Patent
Patel et al.

(10) Patent No.: US 12,803,046 B2
(45) Date of Patent: Nov. 17, 2026

(54) SOLID STATE ELECTROLYTES, SOLID STATE BATTERIES HAVING IMPROVED INTERFACES WITH A SOLID STATE ELECTROLYTE, AND METHODS THEREFORE

(71) Applicant: NEXCERIS INNOVATION HOLDINGS, LLC, Lewis Center, OH (US)

(72) Inventors: Anant Patel, Lewis Center, OH (US); Neil Kidner, Lewis Center, OH (US); Cody Lockhart, Lewis Center, OH (US); Matthew M. Seabaugh, Lewis Center, OH (US); Meghan Stout, Lewis Center, OH (US)

(73) Assignee: NEXCERIS INNOVATION HOLDINGS, LLC, Lewis Center, OH (US)

( * ) Notice: Subject to any disclaimer, the term of this patent is extended or adjusted under 35 U.S.C. 154(b) by 682 days.

(21) Appl. No.: 18/347,493

(22) Filed: Jul. 5, 2023

(65) Prior Publication Data

US 2024/0014439 A1 Jan. 11, 2024

Related U.S. Application Data

(60) Provisional application No. 63/358,492, filed on Jul. 5, 2022.

(51) Int. Cl.
*H01M 10/0562* (2010.01)

(52) U.S. Cl.
CPC .................. *H01M 10/0562* (2013.01); *H01M 2300/0071* (2013.01)

(58) Field of Classification Search
CPC ..... H01M 10/0562; H01M 2300/0071; H01M 10/4235; H01M 2300/0068; H01M 10/052; H01M 10/058; Y02E 60/10
See application file for complete search history.

(56) References Cited

U.S. PATENT DOCUMENTS

| | | | | |
|---|---|---|---|---|
| 2013/0026409 | A1 | 1/2013 | Baker et al. | |
| 2019/0006707 | A1* | 1/2019 | Sakamoto | H01M 4/525 |

FOREIGN PATENT DOCUMENTS

| | | | |
|---|---|---|---|
| JP | 6264807 | B2 | 1/2018 |
| JP | 2018041917 | A | 3/2018 |

OTHER PUBLICATIONS

Neagu et al. :In Situ Growth of Nanoparticles through Exsolution from Perovskite Oxides. Nanomaterials 2020, 10, 2445 (Year: 2020).*

(Continued)

*Primary Examiner* — Daniel H Lee
(74) *Attorney, Agent, or Firm* — Tucker Ellis LLP

(57) ABSTRACT

The interface between solid electrolyte and alkali-metal electrodes is critically important to the performance of a range of electrochemical devices including solid-state batteries. Inhomogeneous solid-electrolyte interfaces can lead to dendrite formation and high interfacial resistance. In the present invention, the interaction between an alkali metal and ceramic solid-electrolyte is enhanced through the in-situ decoration of the solid-electrolyte free surface with metal nanoparticles. The metal nanoparticles are exsolved from metal oxide dopants during the high temperature processing of solid electrolyte membranes.

17 Claims, 3 Drawing Sheets

(56) References Cited

OTHER PUBLICATIONS

Machine Translation of JP 6264807 B2.
Machine Translation of JP 2018041917 A.
International Preliminary Examination Report on Patentability from International Application No. PCT/US2023/069666 dated Dec. 18, 2024.
Written Opinion of the International Search Authority from International Application No. PCT/US2023/069666 dated Oct. 12, 2023.
International Search Report from International Application No. PCT/US2023/069666 dated Oct. 12, 2023.
Cao, D. et al. "Lithium Dendrite in All-Solid-State Batteries: Growth Mechanisms, Suppression Strategies, and Characterizations", Matter 3, 57-94 (2020).
Yamada, Y. & Yamada, A. "Review—Superconcentrated Electrolytes for Lithium Batteries", J. Electrochem. Soc. 162, A2406-A2423 (2015).
Li, N.-W., Yin, Y.-X., Yang, C.-P. & Guo, Y.-G. "An Artificial Solid Electrolyte Interphase Layer for Stable Lithium Metal Anodes", Adv. Mater. 28, 1853-1858 (2016).
Eustathopoulos, N. Wetting by Liquid Metals—Application in Materials Processing: The Contribution of the Grenoble Group, Metals 5, 350-370 (2015).
Barton, J. L., Bockns, J. O. & Ubbelohde, A. R. J. P. "The electrolytic growth of dendrites from ionic solutions", Proc. R. Soc. Lond. Ser. Math. Phys. Set. 268, 485-505 (1962).
Brissot, C., Rosso, M., Chazalviel, J.-N. & Lascaud, S. "Dendritic growth mechanisms in lithium/polymer cells", J. Power Sources 81-82, 925-929 (1999).
Ding, Z., Li, J., Li, J. & An, C. Review—Interfaces: Key Issue to Be Solved for All Solid-State Lithium Battery Technologies . . . Electrochem. Soc. 167, 070541 (2020).
Pesci, F. M. et al. "Elucidating the role of dopants in the critical current density for dendrite formation in garnet electrolytes", J. Mater. Chem. A 6, 19817-19827 (2018).
Tsai, C.-L. et al. "Li7La3Zr2O12 Interface Modification for Li Dendrite Prevention". ACSAppl. Mater. Interfaces 8, 10617-10626 (2016). 10. Luo, W. et al. Reducing Interfacial Resistance between Garnet-Structured Solid-State Electrolyte and Li-Metal Anode by a Germanium Layer. Adv. Mater. 29, 1606042 (2017).
Han, X. et al. "Negating interfacial impedance in garnet-based solid-state Li metal batteries", Nat. Mater. 16, 572-579 (2017).
Chang, H.-J. et al. "Decorating β"-alumina solid-state electrolytes with micron Pb spherical particles for improving Na wettability at lower temperatures", J. Mater. ('hem. A 6. 19703-19711 (2018).
Zhan, X. et al. "A Low-Cost Durable Na—FeC12 Battery with Ultrahigh Rate Capability", Adv. Energy Mater. 10, 1903472 (2020).
Stockham, M. P. et al. "Evaluation of Ga 0.2 Li 6.4 Nd 3 Zr 2 O 12 garnets: exploiting dopant instability to create a mixed conductive interface to reduce interfacial resistance for all solid state batteries", Dalton Trans. 50, 13786-13800 (2021).
Gross, M. M. et al. "Tin-based ionic chaperone phases to improve low temperature molten sodium-NaSICON interfaces", J. Mater. Chem. A 8, 17012-17018 (2020).
Tong, Jianhua et al: "Electrical conductivities of nano ionic composite based on yttrium-doped barium zirconate and palladium metal", Solid State Ionics, vol. 211, (2012) pp. 26-33.

* cited by examiner

SOLID STATE ELECTROLYTES, SOLID STATE BATTERIES HAVING IMPROVED INTERFACES WITH A SOLID STATE ELECTROLYTE, AND METHODS THEREFORE

RELATED APPLICATIONS

This application claims the priority benefit of U.S. Provisional Patent Application Ser. No. 63/358,492, filed 5 Jul. 2022.

INTRODUCTION

Interfacial resistance, dendrite growth, and inhomogeneous solid-electrolyte interface (SEI) formation present major challenges for all-solid state battery (ASSB) commercialization.[1-3] Inhomogeneous SEI formation and high interfacial resistance are often caused by weak interaction between the ceramic electrolyte and alkali metal while dendrite formation can be caused by localized intensification of electric and ionic fields, often a result of uneven metal plating or stripping.[4-6] Dendrite formation is a major safety concern in current batteries.

While the root cause for these mechanisms is varied, they can broadly be attributed to poor or negative interactions between the alkali metals and the solid state electrolytes (SSEs). One strategy to address dendrite formation is to use molten or liquid metal electrodes, such as intermediate temperature sodium-sulfur (Na—S) or sodium metal halide batteries. Wetting agents are often added to overcome surface level effects and improve interactions between the electrolyte and metal electrode; however, the application methods for this step can be expensive, time consuming, or difficult to scale.' Another approach is to introduce dopants to enhance ionic conductivity and densification as a dendrite suppression mechanism; however, these dopants can enable alkali metal to plate between grain boundaries resulting in dendrites forming inside the SSEs themselves.[8] While these limitations are significant, they are not insurmountable.

As stated above, wetting agents are employed as a means of improving contact between the solid electrolyte and alkali metal. Wetting agents act by minimizing the difference between ceramic surface adhesion energy and liquid metal cohesion energy.[4] Good wetting agents mimic the behavior of liquid metals on solid metallic surfaces because these systems exhibit metallic interfacial bonds. As shown in FIG. 1 the presence of a wetting agent can drastically reduce the interfacial resistance between a sodium-conducting sodium zirconium silicate phosphate ($Na_3Zr_2Si_2PO_{12}$) NaSICON ceramic solid electrolyte and alkali sodium metal.

Solid state electrolyte membranes are typically characterized by interfaces with some degree of surface roughness. This roughness can be attributed to primary particle size variation, processing conditions, or localized decomposition of the ceramic structure, all of which can contribute to poor wetting. Researchers have shown that for lithium conducting, lithium lanthanum zirconium oxide (LLZO) solid electrolytes, coatings of gold, germanium, and aluminum oxide promote intimate contact between lithium metal and the LLZO ceramic resulting in minimal dendrite formation and improved performance Similar benefits have been demonstrated for lead or tin coatings for sodium ion systems. 9-13 Although this is a promising approach, the equipment cost and increased process complexity of an additional coating process make it difficult to scale.

In a previously filed patent application, US Published Patent Application No. 2019/0006707, Sakamoto et al. described making SSEs from doped materials. In US2019/0006707, the dopant is exsolved to the grain boundaries. The method of US2019/0006707 results in dopants at the grain boundaries throughout the electrolyte membrane without a concentration of metal nanoparticles forming at a free surface of the electrolyte.

SUMMARY OF THE INVENTION

In the present invention the benefits of wetting and doping agents are achieved by forming metal nanoparticles on the surface of an SSE using an intrinsic process called exsolution. Exsolution exploits differences in the ease of reduction of metal oxides at varying temperatures and atmospheric conditions to precipitate metallic nanoparticles at a free surface. These precipitated nanoparticles are partially embedded in the ceramic framework, thus minimizing sintering or Ostwald ripening effects, whilst maintaining uniform decoration across the electrolyte surface. In methods of the present invention, a dopant(s) is exsolved to form metallic nanoparticles on the surface of an SSE by controlling the sintering conditions of these doped materials. Through careful addition of target metals, a highly decorated electrolyte surface can is created that will improve wetting by providing metallic interfacial bonding sites for the alkali metal.

In a first aspect, the invention provides method of making a solid state electrolyte (SSE), comprising: providing a doped solid state electrolyte comprising a dopant selected from the group consisting of tin, bismuth, copper, molybdenum, lead, tungsten, boron, zinc, manganese, silver, gold, palladium, platinum, iridium, rhodium, ruthenium, and any combination thereof;

wherein the dopant comprises from 0.1 to 15 wt % of the doped solid state electrolyte; calcining the doped solid state electrolyte at a first temperature to form an electrolyte membrane; the electrolyte membrane comprising two major surfaces; treating the electrolyte membrane at a second temperature of at least 600° C. in the presence of an Hz-containing atmosphere for at least 10 minutes to create metal nanoparticles comprising a dopant element on a surface of the electrolyte membrane; and wherein the first temperature is at least 100° C. greater than the second temperature.

In a second aspect, the invention provides a solid state electrolyte membrane, comprising: a membrane comprising a doped solid state electrolyte composition and having two major surfaces and grains defined by grain boundaries on the interior of the membrane; the composition comprising a dopant selected from the group consisting of tin, bismuth, copper, molybdenum, lead, tungsten, boron, zinc, manganese, silver, gold, palladium, platinum, iridium, rhodium, ruthenium, and any combination thereof; wherein the dopant comprises from 0.1 to 15 wt % of the doped solid state electrolyte; wherein at least one of the major surfaces comprises metal nanoparticles wherein the metal particles cover between 2 and 80% of the surface; and wherein the average dopant composition on the surface, measured in surface area, is at least twice that of the average dopant composition on the grain boundary surfaces in the interior of the membrane. Note that for this definition, "surface area" is geometric surface area as observed optically; it does not refer to BET surface area. For example, a 1 cm×1 cm square has a geometric surface area of 1 $cm^2$. The surface area of the dopants at the surface would be measured by top-down electron microscopy of the free surface of the membrane and the surface area of the dopants on the grain boundaries would be measured by cross-section electron-microscopy.

In any of its aspects, the invention can be further characterized by one or any combination of the following: wherein the SSE comprises a sodium zirconium silicate phosphate, (NaSICON, $Na_{1+x}Zr_2Si_xP_{3-x}O_{12}$, x varies between 0 and 3) electrolyte comprising a dopant selected from the group consisting of tin, bismuth, copper, molybdenum, lead, tungsten, silver, gold, palladium, platinum, iridium, rhodium, ruthenium, and any combination thereof; and wherein the dopant comprises 0.2-5 wt % of the doped solid state electrolyte;

- wherein the doped solid state electrolyte is calcined at 1230° C.±50° C. to densify the material, which is then exposed to a reducing environment comprised of 3-8% $H_2$, and preferably balance inert gas (such as $N_2$ and/or Ar and/or He) at an oxygen partial pressure of $10^{-6}$ atm or less (or between $10^{-30}$ and $10^{-6}$) atmosphere and a temperature between 700-1130° C.;
- wherein the dopant is exsolved from the SSE to form metal nanoparticles with a volume average particle size between 10-250 nm; volume average particle size can be measured by electron microscopy;
- wherein the doped solid state electrolyte is combined with a pore former prior to the step of calcining;
- wherein the step of exposing to an Hz-containing atmosphere results in the dopant exsolving from the SSE to form metal nanoparticles on all free surfaces;
- wherein the metal nanoparticles have a volume particle size average between 10-250 nm;
- wherein the SSE comprises lithium lanthanum zirconium oxide electrolyte comprising a dopant selected from the group consisting of tin, bismuth, copper, molybdenum, lead, tungsten, boron, zinc, manganese, silver, gold, palladium, platinum, iridium, rhodium, ruthenium, and any combination thereof; and wherein the dopant comprises 0.2-5 wt % of the doped solid state electrolyte;
- wherein the doped solid state electrolyte is calcined at 1230° C.±50° C. to densify the material, which is then exposed to a reducing environment comprised of 3-8% Hz, and preferably balance inert gas (such as $N_2$ and/or Ar and/or He) at an oxygen partial pressure of $10^{-6}$ atm or less (or between $10^{-30}$ and $10^{-6}$) atmosphere and a temperature between 700-1130° C.;
- wherein the dopant is exsolved from the SSE to form metal nanoparticles with a volume average particle size between 10-250 nm; volume average particle size can be measured by electron microscopy;
- wherein the surface area ratio of dopant at surface:dopant on interior grain boundaries is in the range of 2 to 20 or 3 to 10.
- wherein the doped solid state electrolyte is combined with a pore former prior to the step of sintering at 1230° C.±50° C.;
- wherein the step of exposing to a $H_2$-containing atmosphere results in the dopant exsolving from the SSE to form metal nanoparticles at all free surfaces with a volume average between 10-250 nm;
- wherein the SSE comprises lithium aluminum titanium phosphate electrolyte comprising a dopant selected from the group consisting of tin, bismuth, copper, molybdenum, lead, tungsten, boron, zinc, manganese, silver, gold, palladium, platinum, iridium, rhodium, ruthenium, and any combination thereof; and wherein the dopant comprises 0.2-5 wt % of the doped solid state electrolyte;
- wherein the doped solid state electrolyte is calcined at 1050° C.±50° C. to densify the material, which is then exposed to a reducing environment comprised of 3-8% $H_2$, and preferably balance inert gas (such as $N_2$ and/or Ar and/or He) at an oxygen partial pressure of $10^{-6}$ atm or less (or between $10^{-30}$ and $10^{-6}$) atmosphere and a temperature between 700-950° C.;
- wherein pore former amounts in the method, or pores in the solid state electrolyte, are between 1 and 50 vol. %, or between 5 and 30% or between 10 and 20 vol. %, and, optionally where pore former diameter (or pore diameter) is between 1 and 100 μm or between 2 and 50 μm, or between 5 and 20 μm;
- in the solid state electrolyte, where pores are present, the average dopant composition on the surface of the pores, measured in surface area, is at least twice that of the average dopant composition on the grain boundary surfaces in the interior of the electrolyte;
- wherein the dopant is exsolved from the SSE to form metal nanoparticles with a volume average particle size between 10-250 nm;
- wherein the doped solid state electrolyte is combined with a pore former prior to the step of sintering at 1050° C.±50° C.;
- wherein the step of exposing to a $H_2$-containing atmosphere results in the dopant exsolving from the SSE to form metal nanoparticles at all free surfaces with a volume average particle size between 10-250 nm.

The invention also includes a solid state electrolyte membrane formed by any of the methods described herein.

The invention further includes a method of making a battery comprising placing the solid state electrolyte membrane in between a cathode and an anode.

The invention also includes a battery comprising a solid state electrolyte membrane as described herein.

Free surfaces are surfaces on the exterior of the SSE and surfaces within pores formed by the pore former. Volume average particle size can be measured by electron microscopy.

The invention is often characterized by the term "comprising" which means "including," and does not exclude additional components. The invention includes narrower aspects in which the term "comprising" is replaced by the more restrictive terms "consisting essentially of" or "consisting of."

DETAILED DESCRIPTION OF THE INVENTION

Figure 1:
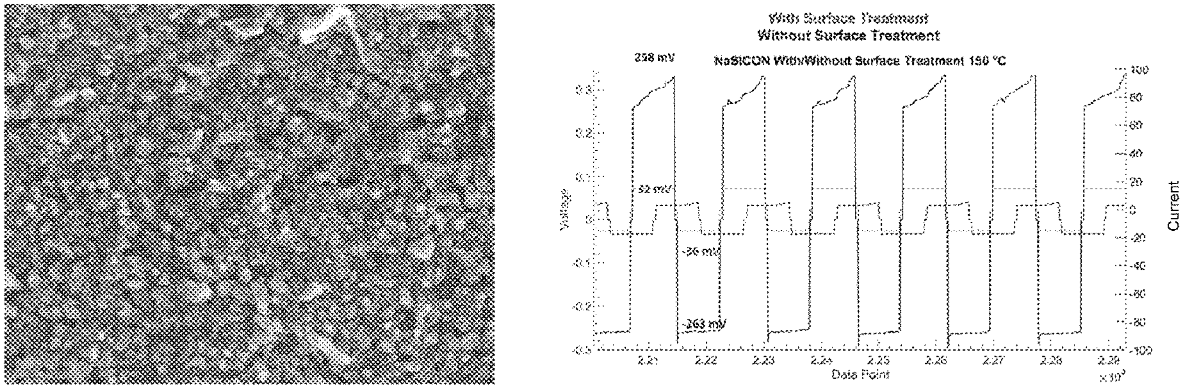
Figure 1 PRIOR ART
FIG. 1 is a SEM micrograph showing the surface of a dense NASICON pellet (left) and a comparison of measured ohmic resistance between two sodium-sodium symmetric cells with NASICON pellets (treated and untreated) acting as the separator.

As is generally understood, a solid state electrolyte is a metal-ion solid conductive material capable of storing and transporting ions between an anode and cathode, so long as the solid material has negligible electronic conductivity and is electrochemically stable against high voltage cathodes and metal (e.g., lithium or sodium) anodes. The preferred SSE is an inorganic material in a crystalline or glassy state, in which cations can diffuse ions through the lattice. They are typically oxide, sulfide, or phosphate-based. Preferred crystal structures include LISICON (lithium superionic conductor) (e.g. LGPS, LiSiPS, LiPS), argyrodite (e.g. Li6PS5X, X=Cl, Br, I), garnets (LLZO), NASICON (sodium superionic conductor) (e.g. $Na_3Zr_2Si_2PO_{12}$, LTP, LATP, LAGP), lithium nitrides (e.g. Li3N), perovskites (e.g. lithium lanthanum titanate, "LLTO"), and lithium halides (LYC, LYB). Examples of SSEs having a glassy state include lithium phosphorus oxynitride (LIPON) and lithium thiophosphates (Li2S—P2S5). $Li_7La_3Zr_2O_{12}$ (LLZO) is a preferred SSE. Other examples of SSEs include any combination of oxide or phosphate materials comprising a garnet, perovskite, NaSICON, or LiSICON phase.

The solid electrolyte preferably has a thickness of 0.1-2000 microns (μm), or 1-1000 microns, or 5-100 microns, or 5-50 microns, or 5-25 microns. The solid electrolyte may comprise a metal-ion conductive ceramic material having the formula $Li_uRe_cM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu; M can be any combination of metals with a nominal valance of +3, +4, +5 or +6 including Zr, Ta, Nb, Sb, W, Hf, Sn, Ti, V, Bi, Ge, and Si; A can be any combination of dopant atoms with a nominal valance of +1, +2, +3 or +4 including H, Na, K, Rb, Cs, Ba, Sr, Ca, Mg, Fe, Co, Ni, Cu, Zn, Ga, Al, B, and Mn; u can vary from 3-7.5; v can vary from 0-3; w can vary from 0-2; x is 0-2; and y can vary from 11-12.5.

SSE Membranes can be produced in a variety of sizes and geometries, including cylindrical tubes, and planar sheets. The dimensions of these membranes can be between 5-500 mm in length and/or width. Preferred dimensions are between 10-300 mm in length and/or width, with more preferred dimensions between 20-200 mm in length and/or width. The membrane can be between 0.1-1000 μm in thickness. Preferred dimensions are between 1-500 μm in thickness, with the most preferred dimensions between 1-100 μm in thickness.

The grain size of the SSE membrane, measured through scanning electron microscopy of fully-dense membranes can be between 50 nm-2000 μm. Preferred grain dimensions are between 50 nm-500 μm, with more preferred grain dimensions between 50 nm-100 μm. Columnar grains (i.e., grains of the thickness of the membrane layer) are ideal as this reduces overall ionic resistance through the membrane (dislocation in ionic pathways between grains reduces maximum ionic conductance, and thus grain boundary resistance is noted as being a "bottleneck" in ion transport through an ASSB); however, minimizing the number of grain boundaries can achieve similar results.

Particle size is a volume average particle size as measured by electron microscopy. Particle size can vary between 10 nm-2000 nm. Preferred particle size range is between 10-500 nm, with more preferred range between 10-250 nm.

Membranes may have between 0-50% porosity, measured via Archimedes density measurements. A dense electrolyte is necessary to achieve two isolated half-cells; however, membranes may have a porous exsolved layer sintered to this dense layer to improve membrane strength. The void volume of the porous exsolved layer may be between 5-65% porosity. Preferably, the void volume would fall between 5-60%, with more preferred void volume between 10-50%.

Dopant concentration can range between 0.1-15%. The preferred dopant concentration is between 0.1-10%, and more preferred dopant concentration between 0.2-5%. For NaSICON and LLZO the sintering temperature, as determined by dilatometry, is 1230° C. The exsolution processes using these SSEs take place at temperatures between 600-1130° C., with the preferred exsolution temperature range between 650 and 1075° C. and more preferred exsolution temperature range between 700 and 1050° C. For LATP the sintering temperature, as determined by dilatometry, is 1050° C. Exsolution processes using this SSE take place at temperatures between 600-950° C., with the preferred temperature range between 650 and 925° C., and more preferred exsolution temperature range between 650 and 900° C. The exsolution process can take between 0.1-10 hours. Preferably the exsolution process will last 0.1-6 hours. More preferred are exsolution processes lasting between 0.5-4 hours.

During calcination and sinter, oxygen partial pressure can be between 0.05-1 atm (max is "normal" air). The Preferred range for oxygen partial pressure is between 0.05-0.21 atm. More preferred range for oxygen partial pressure is between 0.1-0.21 atm. During calcination and sintering, hydrogen partial pressure can be between 0-0.1 atm. Preferred range for hydrogen partial pressure is between 0-0.08 atm. More preferred range for hydrogen partial pressure is between 0 and 0.05 atm.

During exsolution, oxygen partial pressure can be between 0-0.21 atm (max is "normal" air). Preferred range for oxygen partial pressure is between 0-0.01 atm. More preferred range for oxygen partial pressure is between 0 and $10^{-4}$ atm. During exsolution hydrogen partial pressure can be between $10^{-6}$ and 0.1 atm. Preferred range for hydrogen partial pressure is between $10^{-2}$ and 0.08 atm. More preferred range for hydrogen partial pressure is between $10^{-2}$ and 0.06 atm. To form the green bodies, SSE powders can be pressed uniaxially or isostatically. This process can be aided by applying heat; however, with sufficient pressure this is not strictly necessary. For completeness, both pressure and temperature ranges are provided here. Green bodies can be formed by pressing SSE powders at pressures between 500-75,000 PSI and temperatures between 0-100° C. Preferably, pressures range between 750-25,000 PSI and temperatures between 10-90° C. More preferred conditions would be to press green bodies between 1000-10,000 PSI and 20-80° C. Alternatively, electrolytes can be formed by pressing SSE powder at high temperatures and isostatic pressure.

Figure 2:
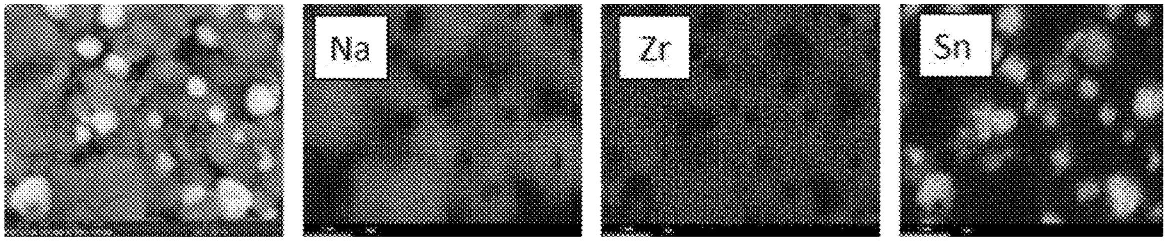
FIG. 2 is a SEM micrograph showing clear phase separation of Sn particles from a tape cast NASICON membrane.
Figure 3:
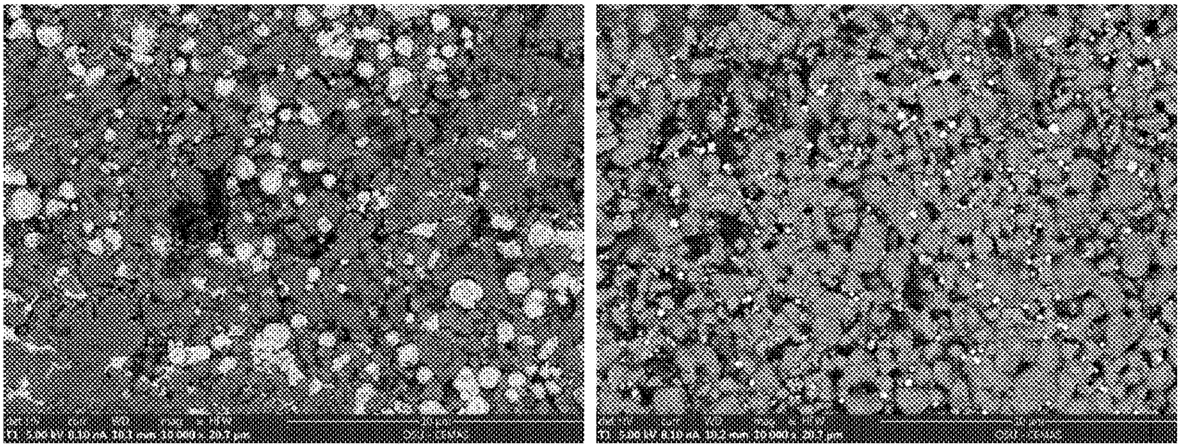
FIG. 3 shows Sn exsolved NASICON membranes sintered at 700° C. (left) and 900° C. (right) under reducing conditions.

NaSICON and LLZO electrolytes produced using this approach can be formed by pressing powders at 500-45,000 PSI and temperatures between 150-1300° C. for times between hours. Preferably this process can be done at 1000-30,000 PSI and temperatures between 300-1250° C. for times between 0.1-8 hours. More preferred are processes that can be done at 2000-6000 PSI, temperatures between 500-1230° C. for times between 0.1-4 hours. LATP electrolytes produced using this approach can be formed by pressing powders at 500-PSI and temperatures between 150-1200° C. for times between 0.1-10 hours. Preferably this process can be done at 1000-30,000 PSI and temperatures between 300-1150° C. for times between 0.1-8 hours. More preferred are processes that can be done at 2000-6000 PSI, and temperatures between 500-1050° C. for times between 0.1-4 hours FIG. 2 shows micrographs of tin particles exsolved from a NaSICON membrane. As seen in FIG. 2, Sn particles have separated from the ceramic; however, the particles are oversized and have created voids in the NASICON surface. Through control of the firing profile (dwell temperature, ramp rates, atmosphere) the exsolve surface microstructure can be controlled as shown in FIG. 3.

Increasing the exsolution temperature from 700 to 900° C. resulted in a reduction in Sn particle size from more than 1 μm to less than 500 nm. While decoration on the surface has improved, the average particle size remains high, and this has been attributed to the Sn dopant concentration and furnace atmosphere. Additionally, the surface of the exsolved membranes is markedly porous when compared to unmodified electrolytes. Optimization of dopant concentration, slurry preparation, and exsolution conditions are likely to improve the quality of the exsolved membrane. The dopant concentration will affect the area fraction of metal nanoparticles on the free surface of the electrolyte. Dopant concentration can be modified to ensure good alkali metal wetting. The exsolve process and the formation of metal nanoparticles on the electrolyte surface create localized surface porosity which can be extremely beneficial. Increased surface porosity increases the free surface area, enabling easier alkali metal deposition on the anode during charging. Furthermore, a roughened electrolyte surface improves the adhesion of mechanical support or sealing layers on the electrolyte through increased mechanical interlocking.

Although the sintering and exsolution heat treatments can be performed in two, discrete steps they can also be combined into a single heat treatment where the atmospheric conditions, specifically oxygen partial pressure, are modified during the run. For example, the heat treatment can begin in an oxygen-rich atmosphere such as humidified nitrogen or forming gas. Humidified gas flows are commonly used for controlled atmosphere heat treatments during the ramp-up to facilitate binder burnout. By controlling when the oxygen partial pressure is lowered (by switching to a dry gas flow and/or addition of higher hydrogen gas flow), creating a more reducing atmosphere, and initiating the exsolution process the location of the exsolved metal nanoparticles can be controlled. For example, waiting until the electrolyte has fully sintered into a dense membrane will only expose the outer surface of the membrane to the reducing environment, exsolving metal nanoparticles only at the surface of the electrolyte membrane. In contrast, if the oxygen partial pressure is lowered, and the exsolution process initiated earlier in the heat treatment when the electrolyte is not fully sintered it may control the distribution of metal nanoparticles through the thickness of the electrolyte membrane.

Selectively controlling the exsolution of the metal nanoparticles on one surface of the electrolyte membrane is possible by preventing exposure to highly reducing conditions during heat treatment. One strategy to achieve this is by placing the green substrates on dense setter plates that do not allow for gas flow to the surface of the substrate in contact with the setter plate. A widely practiced approach for fabricating ceramic electrolyte membranes is through a tape-casting and lamination process. The properties of the tape-cast slurry and tape can be optimized to achieve different microstructures. For example, by stacking laminates of ceramic tape with different dopants one can exsolve different types of metal nanoparticles on the two free surfaces of the electrolyte membrane. This would be beneficial if different wetting and stability properties are required on the anode and cathode-facing surfaces of the electrolyte. The same strategy of stacking electrolyte tape of different compositions to form a compositionally graded membrane can also be used to restrict the exsolved metal nanoparticles only to one surface of the electrolyte membrane. For example, undoped ceramic tape would be used for most of the laminates with only the tape used for the top laminate incorporating the dopant.

As shown in the Examples below, the unmodified electrolyte exhibited an overpotential of about 260 mV during charging and discharging, while the exsolved membrane surprisingly exhibited an overpotential of about only 30 mV: a roughly 90% reduction in overpotential. Exsolution is highly tunable; however, there are limitations on material choices that apply finite constraints on viable compositions. A preferred dopant can be a noble metal oxide in the ceramic, or an element(s) that will be reduced to a metallic state under the targeted sintering conditions. During the firing process, oxygen partial pressure is controlled such that an inert or reducing atmosphere is achieved. In this environment, previously soluble metal oxides will precipitate from the ceramic either at the surface or subsurface causing metallic nanoparticles to grow. This means any dopant added to an SSE must also be the most easily reduced component, otherwise, another constituent component will be reduced resulting in a breakdown of the ceramic structure. Some dopants modify the electrical conductivity of the SSEs, most notably aluminum in LLZ.[14] Pellets made from these materials have been shown to plate lithium or sodium in the grain boundary ultimately enabling dendrite formation causing cells to short. Despite these limitations, multiple metals remain viable candidates for each ceramic electrolyte. Tin, bismuth, copper, molybdenum, and lead could be integrated into the majority of SSEs. Other elements, such as boron, zinc, or manganese are candidate materials for lithium-conducting electrolytes. Preferred lithium-conducting electrolytes include LLZO and LATP. LLZO is a preferred electrolyte for lithium-based ASSBs due to its high ionic conductivity at room temperature. LATP, meanwhile, has a NASICON-type electrolyte structure meaning the parameters for the sodium conducting NaSICON electrolyte may be directly transferrable to this system.

These materials could be used in a variety of form factors or configurations. Ceramic electrolytes, while functional, are less ionically conductive than their liquid-based counterparts. This deficiency is overcome by reducing the thickness of the electrolyte; however, this approach leads to physically weakened membranes which can fracture during normal operation. Researchers have demonstrated porous electrolyte-backed membranes as a means of addressing this challenge but infiltrating the pore volume with wetting agents can be challenging. These uncoated pores create "dead" lithium or sodium volumes, alkali metal no longer participating in the battery reactions, which adversely affects overall cell performance. Conversely, exsolution enables a path for these previously inaccessible voids to be coated with metallic nanoparticles minimizing the risk of islanded alkali metal. This surface modification, coupled with ultra-thin, low resistance dense electrolytes, represents a significant advancement in ASSBs at a cost significantly lower than the state-of-the-art technology.

By controlling conditions during processing, we preferentially exsolve dopant at the membrane surface. The doped powder can be heated during ramp-up under relatively high-pressure oxygen to densify the powder; during the cool down (or separately in a controlled atmosphere) oxygen pressure is reduced to exsolve the dopant. By modifying the oxygen pressure during the sintering profile, a dense solid electrolyte membrane is formed with exsolution primarily at the surface. In some preferred embodiments, the concentration of dopant at a major surface of the electrolyte membrane is at least 2 times, or at least 3 times, or at least 5 times greater than the concentration at the grain boundaries. In this case, concentration is measured by volume percent measured microscopically.

Graded membranes can be achieved with the tape-casting process by laminating different green tapes with differing concentrations of exsolve species. For example, standard, unmodified, electrolyte tapes and exsolvable electrolyte tapes laminated to one another to form a membrane with different surface morphologies at each electrode interface. We could also spray a thin layer of exsolvable electrolyte powder onto the green tape to produce an ultrathin coating with many of the same benefits but at a lower cost.

The solid state electrolyte can be used in a battery that includes a current collector in contact with a cathode. The solid state electrolyte is arranged between the cathode and an anode that is in contact with a current collector (e.g., aluminum). A preferred active material for the cathode is a lithium host material. An example cathode active material is a lithium metal oxide wherein the metal is one or more of aluminum, cobalt, iron, manganese, nickel, and vanadium. Non-limiting examples lithium metal oxides include $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, and $LiNi_xCo_yAl_zO_2$. Another example of a cathode active material is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on delithiation, and cycling performance of the cathode materials. The cathode active material can be a mixture of any number of these cathode-active materials. The cathode preferably has a thickness between 0.1 microns and 400 microns, between 10 microns and 200 microns, or between 50 microns and 150 microns.

The green (uncalcined) form of the SSE may contain pore formers. Pore formers could include any material that will burn out during high temperature heat treatment such as carbon, graphite, polymethyl methacrylate (PMMA), sucrose and polystyrene. Pore former amounts (vol. % measured by cross section electron microscopy), if present, may be between 1 and 50 vol. %, more preferably between and 30% and more preferably range between 10 and 20 vol. %. Pore former diameter is preferably between 1 and 100 microns (μm) measured by particle size analysis; preferably between 2 and 50 microns, still more preferably between 5 and 20 microns.

A suitable active material for the anode comprises lithium metal, magnesium, sodium, or zinc metal. The anode preferably has a thickness between 0.1 micron and 400 microns, between microns and 200 microns, or between 50 microns and 150 microns.

Figure 4:
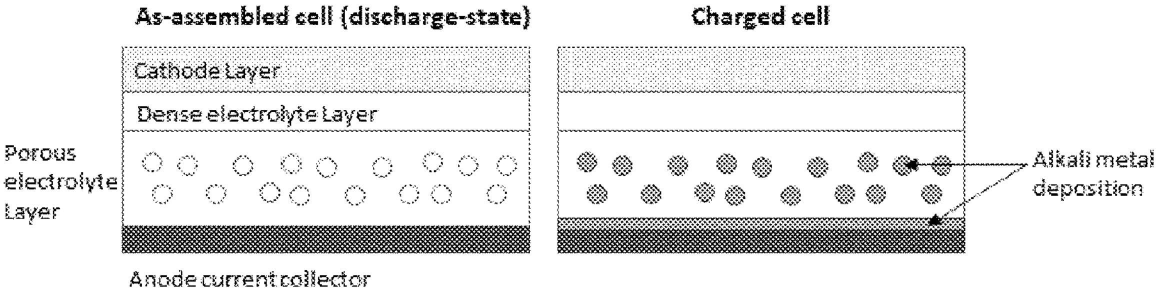
FIG. 4 shows an example of cell assembled with dense/porous electrolyte membrane.
Figure 5:
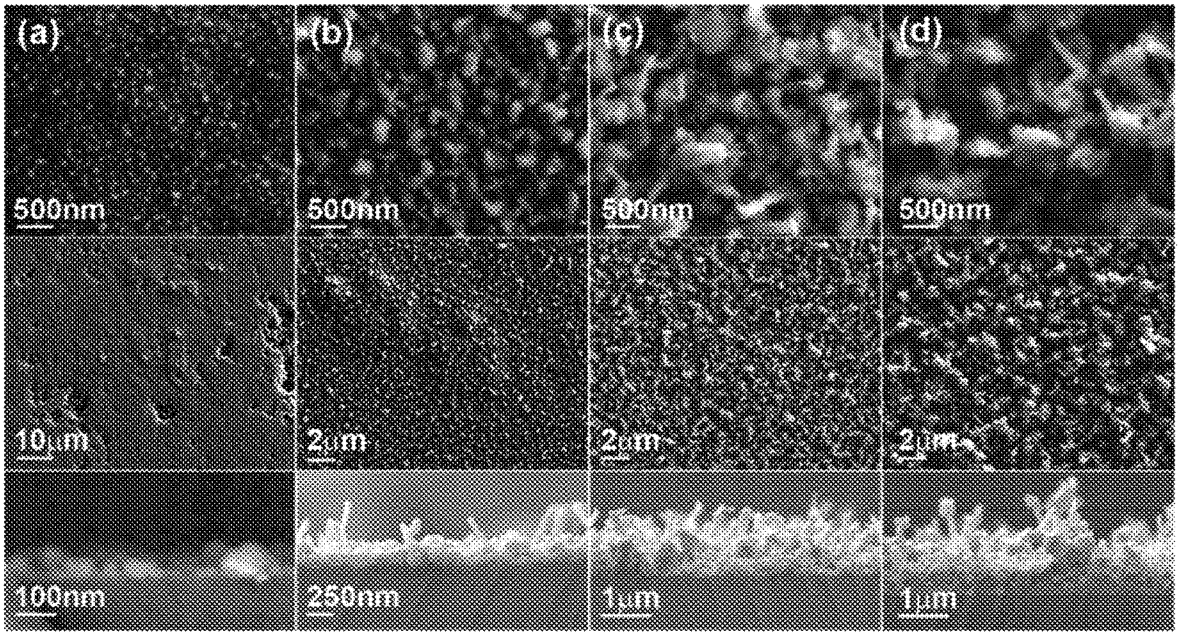
Figure 5 PRIOR ART
FIG. 5 shows images from Gross, M. M. et al. Tin-based ionic chaperone phases to improve low temperature molten sodium—NaSICON interfaces. *J. Mater. Chem. A* 8, 17012-17018 (2020). Images show tin deposited on the electrolyte surface at increasing thicknesses.

FIG. 4 shows how a cell assembled using this invention (exsolved electrolyte with a dense layer and porous backbone layer) may appear once it has become operational. The left figure shows the cell as it would appear at after assembly (fully discharged), and the bottom shows the alkali metal deposited into the pore volume of the fully charged cell. Because the metal nanoparticles exsolved onto the surface of the electrolyte's porous layer, alkali metal can and will deposit into these volumes during charging steps. The alkali metal deposited into these pores is accessible to participate in the discharge reaction, mitigating the risk of islanded alkali metal.

Unlike comparable technologies which rely on a secondary application of a wetting agent, the in situ formation of the metal nanoparticles on the surface of the pores effectively wet alkali metal enabling the pore volume to be "active" in the cell operation. Wetting agents applied following electrolyte densification or sintering are unable to infiltrate the pore volume effectively, thus creating inherently non-wetting pore surfaces also known as "dead" volume. The properties of the porous layer can be tuned such that the pore volume is sufficient to accommodate the total alkali metal volume when fully charged. While the exsolution process can introduce a degree of porosity, the addition of pore formers can be used to increase the pore volume within an electrolyte layer. Alternatively, the thickness of the porous layer can be increased to minimize membrane fracturing due to pressure changes caused by the forward and reverse reactions. During the charge reaction the exsolved metal nanoparticles within the pore volume will form an alloy with the alkali metal (i.e., Na alloying with Sn), and this alloy acts to form a stable solid-electrolyte interface (SEI). Researchers have shown similar "chaperone" layers can improve cell performance; however, these are applied ex situ via methods such as atomic layer deposition or sputter coating, and these metals exist as a distinct, homogenous layer consisting solely of the chaperone metal.[15] Instead, this invention will produce metal nanoparticles embedded within the ceramic electrolyte itself, and they will exist as discrete particles uniformly distributed across the electrolyte's free surfaces (pore and exterior).

EXAMPLES

Electrolyte Synthesis

Exsolved ceramic electrolytes are produced by first synthesizing doped electrolytes using the desired materials. Dopant concentrations can range between 0.25 mol. % and 20 mol. % of the final ceramic. Multiple synthesis routes are viable, such as sol-gel or coprecipitation; however, solid-state synthesis methods are viewed as the simplest and most cost-effective.

Begin by dry mixing the raw materials for the desired electrolyte. For tin-doped NaSICON ($Na_3Zr_2Si_2PO_{12}$) these would be anhydrous sodium phosphate, tribasic ($Na_3PO_4$), zirconium silicate ($ZrSiO_4$), silicon dioxide ($SiO_2$), and tin oxide ($SnO_2$). In this procedure, tin is added as a substitute for zirconium in the NaSICON ceramic due to both elements exhibiting a 2+ valence state. The target formulation would be: $Na_3Zr_{1.75}Sn_{0.25}Si_2PO_{12}$.

Once the powders have been thoroughly combined, they are then placed into an attrition mill with isopropyl alcohol to reduce the average particle size whilst reducing localized variations in composition. The powders are milled for roughly 4 hrs. The milled material is then dried of any remaining solvents, and the dried powder is pushed through a fine mesh sieve to break up any large agglomerates.

The sieved powder is then placed into an alumina saggar and calcined to 1200° C./12 hours. Once cool, the powder is sieved again, and placed back into the attrition mill to reach a target surface area between 4-6 $m^2/g$ (BET measurement). The milled powder is dried and analyzed via X-ray diffraction (XRD) to quantify the phase purity of the material.

At this stage, the doped powder can be treated identically to undoped electrolytes, and can be converted into aerosol spray suspensions, screen printable inks, or extruded. Alternatively, thin membranes of the material can be made via tape casting. To achieve this the doped powder is combined with the appropriate solvents (i.e., ethanol, xylene, or toluene), dispersants, plasticizers (i.e., PAG, BBP, PVB), and, if desired, pore formers to form a tape casting slurry. The slurry can then be cast between 5 and 200 μm thick and the desired width. Tapes can then be cut, stacked, and laminated together to achieve the desired thickness. The laminated tape can then be cut into a variety of shapes before being sintered in a furnace.

For NaSICON, the tape should be fired to 1200° C. for 4 hours in an air atmosphere. This enables the NaSICON ceramic to fully densify, a necessary step for achieving charge separation in an electrochemical cell. Once the sintering step is complete the furnace temperature should be brought down slowly to 700-900° C., and the atmosphere changed to a reducing environment consisting of 5% Hz/balance $N_2$. The furnace should be held at these conditions between 0.5-6 hours with the desired final surface morphology dictating the dwell time. This is the exsolution step where the dopant element will preferentially precipitate onto the electrolyte surface. Once the exsolution step has completed, the furnace should be allowed to cool to ambient conditions, and the membranes removed. The membranes can then be examined by SEM to characterize the surface morphology or placed in a symmetric alkali metal cell (i.e., a sodium-sodium cell) to quantify interfacial resistance.

Symmetric Cell Measurement

Once an exsolved membrane has been produced, it can be placed into a symmetric sodium-sodium cell to quantify interfacial resistance/overpotentials. Symmetric cells are assembled by placing the membrane into a heat-resistant test fixture made from alumina coating one edge of the membrane with a glass ink. The fixture is then fired to 800° C. to cure the glass. This creates an impermeable seal around the electrolyte membrane thus separating both half-cells. Both half cells are then loaded with equal quantities of sodium metal (~100 mg), and molybdenum foil contacts are placed into each half-cell to act as the electrodes. The fixture is then placed between two compression plates with bolts torqued to a predefined value (~40 in-lbs.). The fixture is then checked for electrical shorts, and if no shorting path is observed the membrane is ready for testing.

Figure 6:
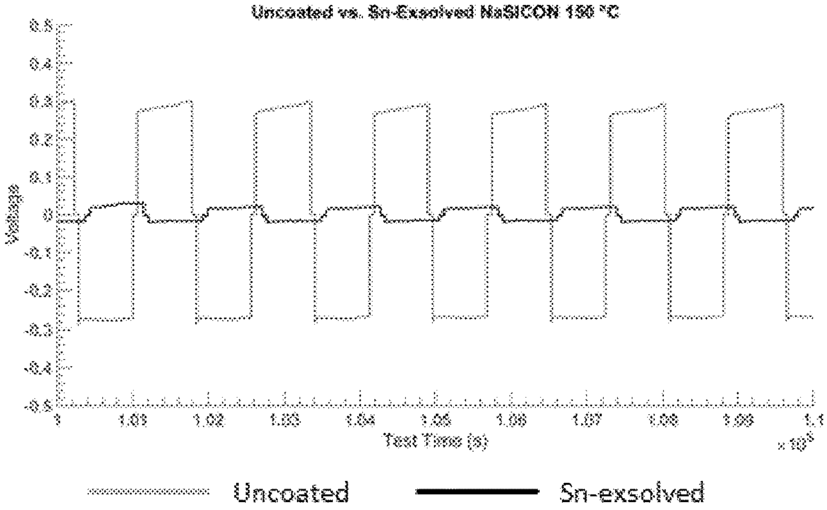
FIG. 6 shows the voltage response of uncoated and exsolved NaSICON membranes when cycled at ±15 $mA/cm^2$.

The test fixture is heated to a temperature above the alkali metal melting point. For sodium-sodium cells, temperatures above 100° C. are sufficient; for lithium-lithium cells, temperatures must exceed 180° C. The purpose of this is to 1) eliminate potential dendrite formation routes, and 2) ensure the active surface area is identical for both half cells. Once the test fixture has reached the desired temperature, the cell is cycled galvanostatically at increasing current densities ($mA\cdot cm^{-2}$). The objective is to monitor the voltage response of the cell to increasing currents. Because this is a symmetric reaction, any deviation from OV while under load is indicative of some systemic resistance. A linear plot should be obtained when plotting steady-state voltage vs current density. The slope of this line would be the ohmic resistance of that membrane at that temperature. Alternatively, this experiment can be performed using an unmodified membrane, and differences in voltage between the unmodified electrolyte and exsolved electrolyte can be used to calculate the influence of interfacial resistance. For simplicity, poorly wetted membranes will exhibit higher voltages than well-wetted membranes when exposed to equivalent current densities. This data, along with values calculated using techniques such as electrochemical impedance spectroscopy, can be used to quantify the electrochemical properties of a ceramic electrolyte. FIG. 6 shows the voltage response of symmetric cell results for uncoated and Sn-exsolved NaSICON electrolyte membranes cycled at ±15 $mA/cm^2$. The Sn-exsolved NaSICON cell shows a significantly lower voltage than the uncoated NaSICON cell indicating a lower interfacial resistance through improved wetting.

REFERENCES

ADDIN ZOTERO_BIBL {"uncited":[ ],"omitted":[ ],"custom":[ ]} CSL_BIBLIOGRAPHY 1. Cao, D. et al. Lithium Dendrite in All-Solid-State Batteries: Growth Mechanisms, Suppression Strategies, and Characterizations. *Matter* 3, 57-94 (2020).

2. Yamada, Y. & Yamada, A. Review—Superconcentrated Electrolytes for Lithium Batteries. *J. Electrochem. Soc.* 162, A2406—A2423 (2015).

3. Li, N.-W., Yin, Y.-X., Yang, C.-P. & Guo, Y.-G. An Artificial Solid Electrolyte Interphase Layer for Stable Lithium Metal Anodes. *Adv. Mater.* 28, 1853-1858 (2016).

4. Eustathopoulos, N. Wetting by Liquid Metals—Application in Materials Processing: The Contribution of the Grenoble Group. *Metals* 5, 350-370 (2015).

5. Barton, J. L., Bockris, J. O. & Ubbelohde, A. R. J. P. The electrolytic growth of dendrites from ionic solutions. *Proc. R. Soc. Lond. Ser. Math. Phys. Sci.* 268, 485-505 (1962).

6. Brissot, C., Rosso, M., Chazalviel, J.-N. & Lascaud, S. Dendritic growth mechanisms in lithium/polymer cells. *J. Power Sources* 81-82, 925-929 (1999).

7. Ding, Z., Li, J., Li, J. & An, C. Review—Interfaces: Key Issue to Be Solved for All Solid-State Lithium Battery Technologies. *J. Electrochem. Soc.* 167, 070541 (2020).

8. Pesci, F. M. et al. Elucidating the role of dopants in the critical current density for dendrite formation in garnet electrolytes. *J. Mater. Chem. A* 6, 19817-19827 (2018).

9. Tsai, C.-L. et al. $Li7La3Zr_{2012}$ Interface Modification for Li Dendrite Prevention. *ACS Appl. Mater. Interfaces* 8, 10617-10626 (2016).

10. Luo, W. et al. Reducing Interfacial Resistance between Garnet-Structured Solid-State Electrolyte and Li-Metal Anode by a Germanium Layer. *Adv. Mater.* 29, 1606042 (2017).

11. Han, X. et al. Negating interfacial impedance in garnet-based solid-state Li metal batteries. *Nat. Mater.* 16, 572-579 (2017).

12. Chang, H.-J. et al. Decorating β"-alumina solid-state electrolytes with micron Pb spherical particles for improving Na wettability at lower temperatures. *J. Mater. Chem. A* 6, 19703-19711 (2018).

13. Zhan, X. et al. A Low-Cost Durable Na—FeCl2 Battery with Ultrahigh Rate Capability. *Adv. Energy Mater.* 10, 1903472 (2020).

14. Stockham, M. P. et al. Evaluation of $Ga_{0.2}Li_{6.4}Nd_3Zr_2O_{12}$ garnets: exploiting dopant instability to create a mixed conductive interface to reduce interfacial resistance for all solid state batteries. *Dalton Trans.* 50, 13786-13800 (2021).

15. Gross, M. M. et al. Tin-based ionic chaperone phases to improve low temperature molten sodium—NaSICON interfaces. *J. Mater. Chem. A* 8, 17012-17018 (2020).

What is claimed is:

1. A solid state electrolyte membrane, comprising:

a membrane comprising a doped solid state electrolyte composition and having two major surfaces and grains defined by grain boundaries on the interior of the membrane;

the composition comprising a dopant selected from the group consisting of tin, bismuth, copper, molybdenum, lead, tungsten, boron, zinc, manganese, silver, gold, palladium, platinum, iridium, rhodium, ruthenium, and any combination thereof;

wherein the dopant comprises from 0.1 to 15 wt % of the doped solid state electrolyte composition;

wherein at least one of the two major surfaces comprises metal nanoparticles;

wherein the metal nanoparticles cover between 2 and 80% of the at least one of the two major surfaces; and wherein the average dopant concentration on the at least one of the two major surfaces, measured in surface area, is at least twice that of the average dopant concentration on the grain boundary surfaces in the interior of the membrane.

2. A battery comprising the solid state electrolyte membrane of claim 1.

3. The battery of claim 2 further comprising a cathode and an anode, wherein the solid state electrolyte membrane is arranged between the cathode and the anode.

4. The battery of claim 3, wherein the anode comprises lithium or sodium.

5. The solid state electrolyte membrane of claim 1, wherein the metal nanoparticles have a volume particle average size of between 10 nm and 150 nm.

6. The solid state electrolyte membrane of claim 1, wherein the metal nanoparticles have a volume particle average size of less than 500 nm.

7. The solid state electrolyte membrane of claim 1, wherein the doped solid state electrolyte composition is a ceramic.

8. The solid state electrolyte membrane of claim 7, wherein the metal nanoparticles are partially embedded in the ceramic network.

9. The solid state electrolyte membrane of claim 1, wherein doped solid state electrolyte composition comprises a sodium zirconium silicate phosphate electrolyte (NaSICON, $Na_{1+x}Zr_2Si_xP_{3-x}O_{12}$, x varies between 0 and 3).

10. The solid state electrolyte membrane of claim 1, wherein the dopant comprises 0.2 to 5 wt % of the doped solid state electrolyte composition.

11. The solid state electrolyte membrane of claim 1, wherein doped solid state electrolyte composition comprises a lithium lanthanum zirconium oxide electrolyte.

12. The solid state electrolyte membrane of claim 1, wherein doped solid state electrolyte composition comprises a lithium aluminum titanium phosphate electrolyte.

13. The solid state electrolyte membrane of claim 1, wherein the average dopant concentration on the at least one of the two major surfaces, measured in surface area, is at least three times that of the average dopant concentration on the grain boundary surfaces in the interior of the membrane.

14. The solid state electrolyte membrane of claim 1, wherein the average dopant concentration on the at least one of the two major surfaces, measured in surface area, is at least five times that of the average dopant concentration on the grain boundary surfaces in the interior of the membrane.

15. A solid state electrolyte membrane, comprising:

a membrane comprising a doped solid state electrolyte composition and having two major surfaces and grains defined by grain boundaries on the interior of the membrane, the composition comprising a dopant, wherein the dopant comprises from 0.1 to 15 wt % of the doped solid state electrolyte composition, wherein at least one of the two major surfaces of the membrane comprises metal nanoparticles, the metal nanoparticles covering between 2 and 80% of the at least one of the two major surfaces, and wherein the average dopant concentration on the at least one of the two major surfaces, measured in surface area, is at least twice that of the average dopant concentration on the grain boundary surfaces in the interior of the membrane.

16. A solid state electrolyte membrane, comprising:

a membrane comprising a doped solid state electrolyte composition and having two major surfaces and grains defined by grain boundaries on the interior of the membrane, the composition comprising a dopant, wherein the dopant comprises from 0.1 to 15 wt % of the doped solid state electrolyte composition, wherein at least one of the two major surfaces of the membrane comprises metal nanoparticles, the metal nanoparticles having a volume particle average size of less than 500 nm, and wherein the average dopant concentration on the at least one of the two major surfaces, measured in surface area, is at least twice that of the average dopant concentration on the grain boundary surfaces in the interior of the membrane.

17. The solid state electrolyte membrane of claim 16, wherein the metal nanoparticles cover between 2 and 80% of the at least one of the two major surfaces.

* * * * *